(12) United States Patent
Bohlke et al.

(10) Patent No.: US 9,409,509 B2
(45) Date of Patent: Aug. 9, 2016

(54) DEVICE FOR SECURING STORED MATERIALS IN A STORAGE SPACE AND SECURING ELEMENT THEREFOR

(71) Applicants: Hartmut Bohlke, Wuppertal (DE);
Juergen Salewski, Duesseldorf (DE);
Wolfgang Sitzler, Wuppertal (DE);
Wolfram Zummack, Troisdorf (DE);
Bogdan Tutelea, Leichlingen (DE);
Andreas Goebbels, Kuerten (DE)

(72) Inventors: Hartmut Bohlke, Wuppertal (DE);
Juergen Salewski, Duesseldorf (DE);
Wolfgang Sitzler, Wuppertal (DE);
Wolfram Zummack, Troisdorf (DE);
Bogdan Tutelea, Leichlingen (DE);
Andreas Goebbels, Kuerten (DE)

(73) Assignee: BOS GMBH & CO. KG, Ostfildern (DE)

( * ) Notice: Subject to any disclaimer, the term of this patent is extended or adjusted under 35 U.S.C. 154(b) by 21 days.

(21) Appl. No.: 14/534,520

(22) Filed: Nov. 6, 2014

(65) Prior Publication Data

US 2015/0121666 A1    May 7, 2015

(30) Foreign Application Priority Data

Nov. 7, 2013   (DE) .......................... 10 2013 222 651

(51) Int. Cl.
*B61D 45/00*   (2006.01)
*B60P 7/08*    (2006.01)
*F16B 2/04*    (2006.01)

(52) U.S. Cl.
CPC ................ *B60P 7/0815* (2013.01); *F16B 2/04* (2013.01); *Y10T 24/44026* (2015.01)

(58) Field of Classification Search
CPC ............ F16B 2/04; B60P 7/0815; B60P 7/08; B60R 5/04; Y10T 24/44026
USPC ....................... 248/222.13; 410/104, 101, 105
See application file for complete search history.

(56) References Cited

U.S. PATENT DOCUMENTS

| 6,585,465 B1 * | 7/2003 | Hammond ............ B60P 7/0815 410/104 |
| 6,592,310 B2 * | 7/2003 | Hyp ...................... B60P 7/0807 296/65.13 |

(Continued)

FOREIGN PATENT DOCUMENTS

| DE | 10 2005 061 493 A1 | 7/2007 |
| DE | 10 2011 087 363 A1 | 5/2013 |
| DE | 10 2012 221 386 A1 | 5/2014 |

OTHER PUBLICATIONS

Examination Report of German Patent Office issued in Application No. 10 2013 222 651.9 dated Aug. 6, 2014 (5 pages).

*Primary Examiner* — Anita M King
(74) *Attorney, Agent, or Firm* — Flynn, Thiel, Boutell & Tanis, P.C.

(57) ABSTRACT

A device having a securing element which can be blocked in a load rail which is anchored so as to be fixed to a vehicle, the securing element having a base member with a retention region which can be inserted into the load rail in a positive-locking manner, and the base member includes at least one bar member for engagement in a catch bar arrangement of the load rail which is supported so as to be able to be moved relative to the base member. A additional bar is provided which is movably supported parallel with the bar member and independently of the bar member, and which is resiliently loaded in the direction of the blocking position and which can be moved together with the bar member into the release position.

8 Claims, 4 Drawing Sheets

(56) References Cited

U.S. PATENT DOCUMENTS

| | | | | |
|---|---|---|---|---|
| 6,644,901 B2 * | 11/2003 | Breckel | ............... | B61D 45/001 410/104 |
| 6,827,531 B2 * | 12/2004 | Womack | ............... | B61D 45/001 410/104 |
| 7,070,374 B2 * | 7/2006 | Womack | ............... | B61D 45/001 410/104 |
| 7,156,593 B1 * | 1/2007 | Saward | ............... | B61D 45/001 410/104 |
| 7,980,798 B1 * | 7/2011 | Kuehn | ............... | B60P 7/0815 410/104 |
| 8,277,157 B2 * | 10/2012 | Parsons | ............... | B61D 45/001 410/104 |
| 2008/0253855 A1 * | 10/2008 | Bohlke | ............... | B60P 7/0815 410/104 |

\* cited by examiner

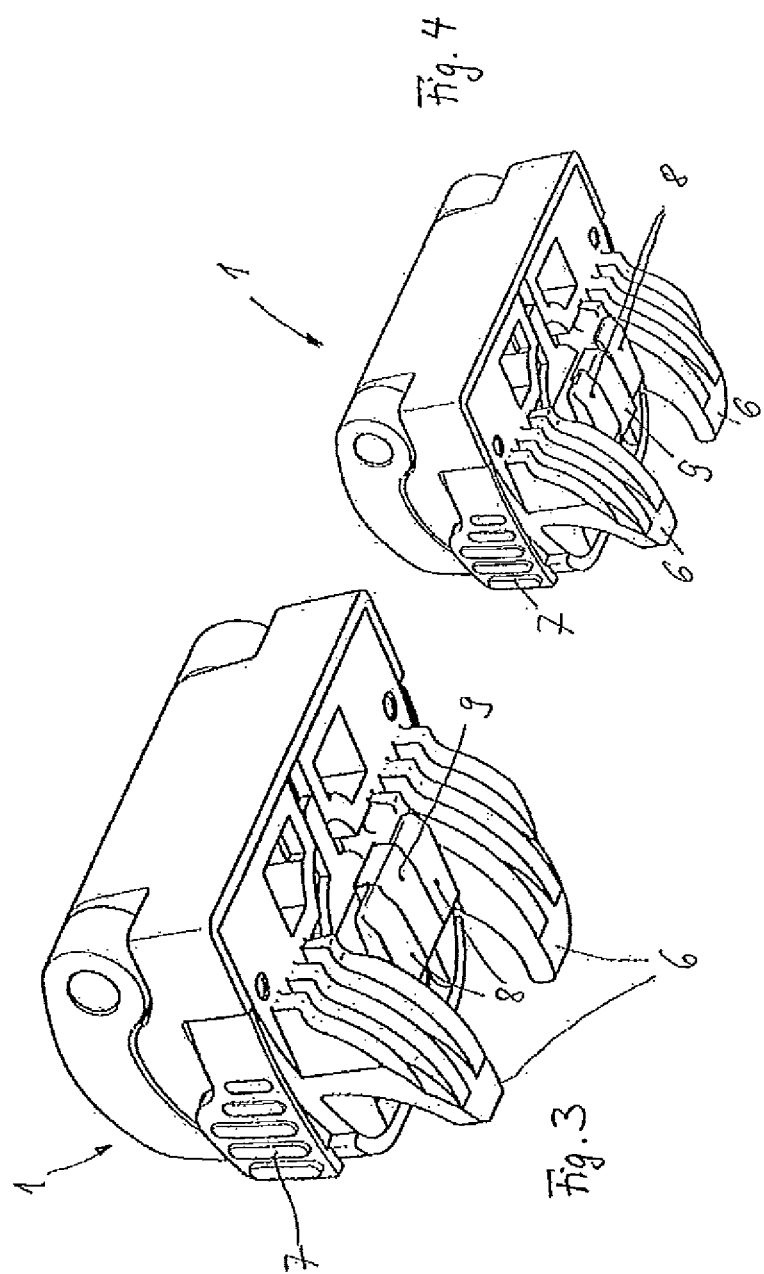

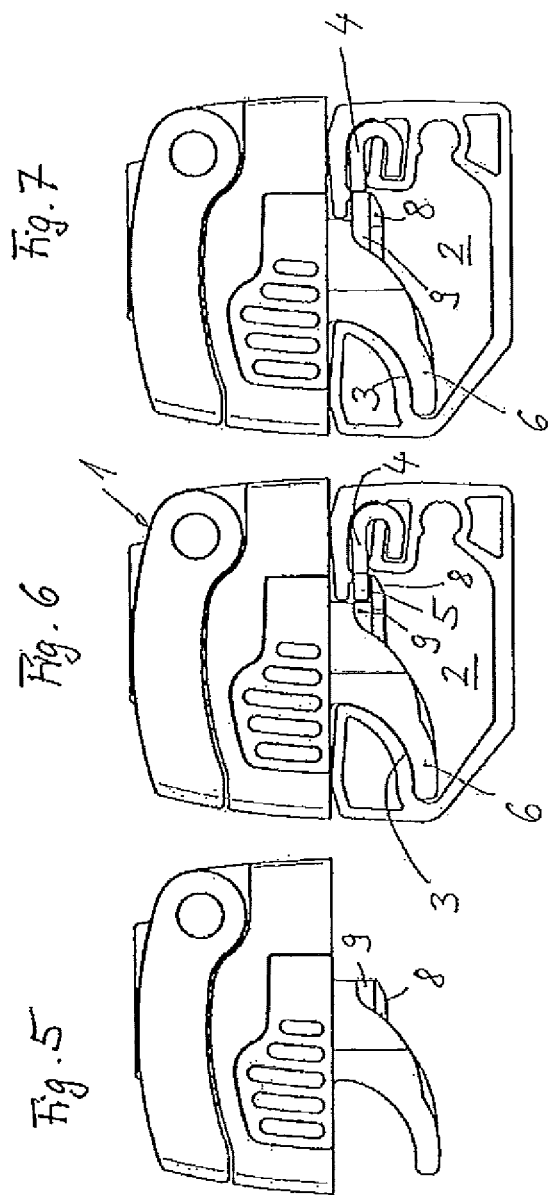

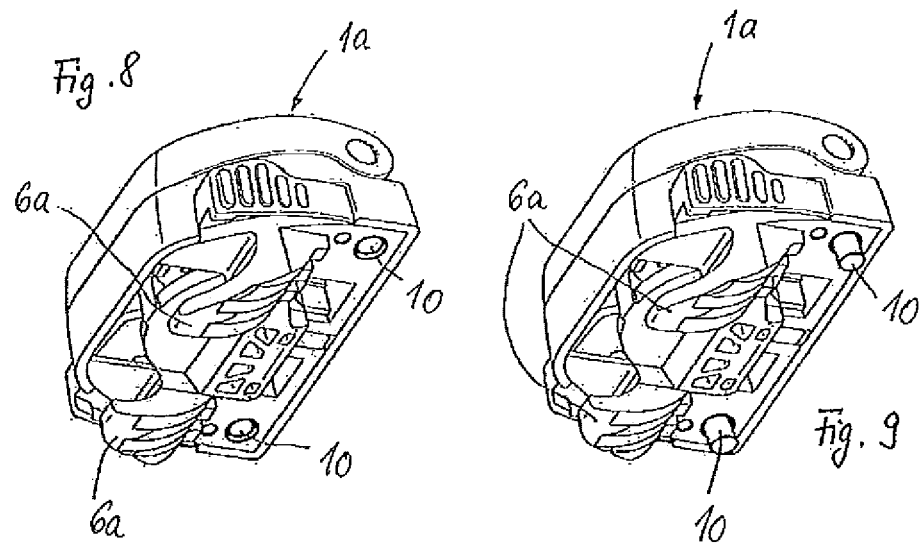
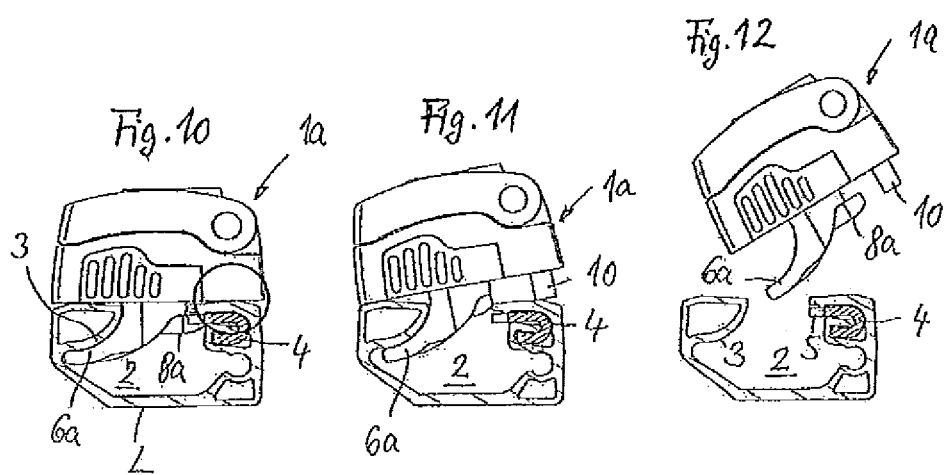

DEVICE FOR SECURING STORED MATERIALS IN A STORAGE SPACE AND SECURING ELEMENT THEREFOR

CROSS-REFERENCE TO RELATED APPLICATIONS

This application claims the priority of the German patent application DE 10 2013 222 651.9, the disclosure of which is hereby incorporated into this application.

BACKGROUND OF THE INVENTION

The invention relates to a device for securing stored materials in a storage space using a securing element which can be blocked in a load rail which is anchored so as to be fixed to a vehicle, the securing element having a base member which has a retention region which can be inserted into the load rail in a positive-locking manner, and the base member comprising at least one bar member for engagement in a catch bar arrangement of the load rail which is supported so as to be able to be moved relative to the base member by means of an adjustment element which can be manually operated in order to be able to be moved between a blocking position and a release position.

Such a device is known from DE 10 2011 087 363 A1. The known device for securing stored materials comprises a load rail which is provided with an elongate hollow space which is open in an upward direction via a groove. In the load rail, there is integrated a catch bar arrangement which extends over the length of the load rail and which is provided with a large number of catch recesses which are spaced apart with uniform distribution relative to each other. A side of the hollow space of the load rail opposite the catch bar arrangement is provided with a wall which is curved in a convex manner. The device for securing stored materials further comprises at least one securing element which is provided with two introduction webs which are curved in a convex manner and which are in abutment with the convex wall of the hollow space of the load rail in the inserted state of the securing element. In addition, the securing element comprises a bar member which can be manually operated and which can be engaged in corresponding catch recesses of the catch bar arrangement when the securing element is in the inserted state. An engagement of the bar member in the catch bar arrangement of the load rail is carried out when the bar member is orientated in alignment with a corresponding catch recess of the catch bar arrangement and can be introduced into the catch recess by means of resilient force.

BRIEF SUMMARY OF INVENTION

An object of the invention is to provide a device for securing stored materials of the type mentioned in the introduction, which enables improved engagement of a securing element in the load rail.

This object is achieved in that there is associated with the bar member an additional bar which is movably supported independently of the bar member and which is resiliently loaded in the direction of the blocking position and which can be moved together with the bar member into the release position. As a result of the additional bar, an apparent locking of the securing element in the load rail is prevented. Such an apparent locking may occur when the securing element is positioned in the load rail in such a manner that the corresponding bar member is not positioned in alignment with the catch recess of the catch bar arrangement. The additional bar ensures that, even when the bar member is not engaged, the additional bar in any case achieves securing of the securing element relative to the catch bar arrangement of the load rail and can consequently bring about the positive-locking securing. The solution according to the invention can be used in the same manner as in DE 10 2011 087 363 A2. Preferably, the additional bar can be moved parallel with the bar member.

According to the invention, the additional bar is resiliently loaded exclusively in the direction of the blocking position so that it is automatically displaced below the catch bar arrangement as soon as the securing element has been inserted into the load rail.

In another embodiment of the invention, the additional bar is constructed as a dual bar having two bar projections whose width is greater than a width of a catch recess of the catch bar arrangement and the bar member is positioned between the two bar projections of the additional bar. As a result of the fact that the width of each bar projection of the additional bar is greater than the width of a correspondingly associated catch recess of the catch bar arrangement, it is also ensured, when the two bar projections are positioned precisely below adjacent catch recesses and the bar member is positioned precisely at the front end on a locking tooth, that the base member of the securing element cannot be lifted off upwards since the bar projections of the additional bar engage below the edges of the adjacent catch recesses.

The problem addressed by the invention is also solved in that the securing element comprises at least one resiliently loaded support means which supports the securing element in the unlocked state relative to the load rail in a raised intermediate position which can be visually identified. As a result of this solution according to the invention, although it is not possible to automatically lock the securing element in the load rail after the securing element has been inserted, this solution ensures that unsuccessful locking can be identified. An apparent locking cannot therefore occur. Either the securing element is locked in the catch rail, and the securing element is then positioned with the outer portions thereof on the load rail in a flush manner, or the securing element is not locked in the catch rail arrangement, and it then remains in a raised intermediate position which is preferably orientated in an inclined or tilted manner with respect to the load rail and which can be identified by a viewer.

Finally, the invention also relates to a securing element for a device for securing stored materials, as described above, the securing element comprising the associated features of the corresponding device for securing stored materials.

Other advantages and features of the invention will be appreciated from the claims and the following description of preferred exemplary embodiments of the invention which are illustrated with reference to the drawings.

BRIEF DESCRIPTION OF THE DRAWINGS

FIG. 3 is an enlarged isometric illustration of the securing element for the device according to FIGS. 1 and 2, when viewed obliquely from below, FIG. 4 shows the securing element according to FIG. 3 in another position of a bar member, FIG. 5 is a side view of the securing element according to FIGS. 1 to 4, FIG. 6 is a side view of the device according to FIG. 2 with the securing element inserted into the load rail, FIG. 7 is an illustration similar to FIG. 6 with the blocked securing element, FIG. 8 is an isometric illustration of another securing element according to another embodiment of a device according to the invention for securing stored materials when viewed in an oblique manner from below, FIG. 9 shows the securing element according to FIG. 8 with deployed support means, FIG. 10 is a side view of the device with the securing element according to FIG. 8, FIG. 11 shows the device according to FIG. 10 in a raised intermediate position of the securing element, and FIG. 12 shows the device when the securing element is in a state remote from the load rail.

DETAILED DESCRIPTION OF THE INVENTION

Figure 1:
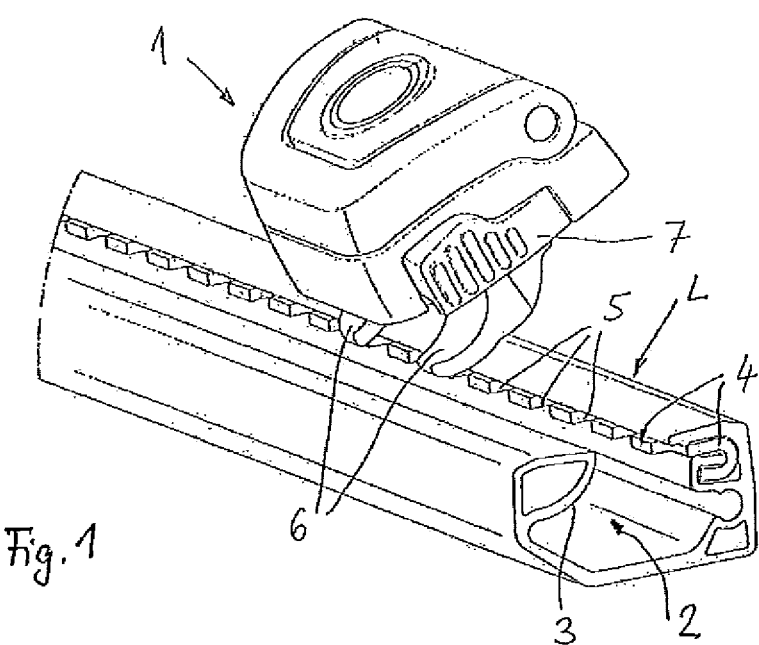
FIG. 1 is a perspective view of an embodiment of a device according to the invention for securing stored materials in a released position of a securing element.
Figure 2:
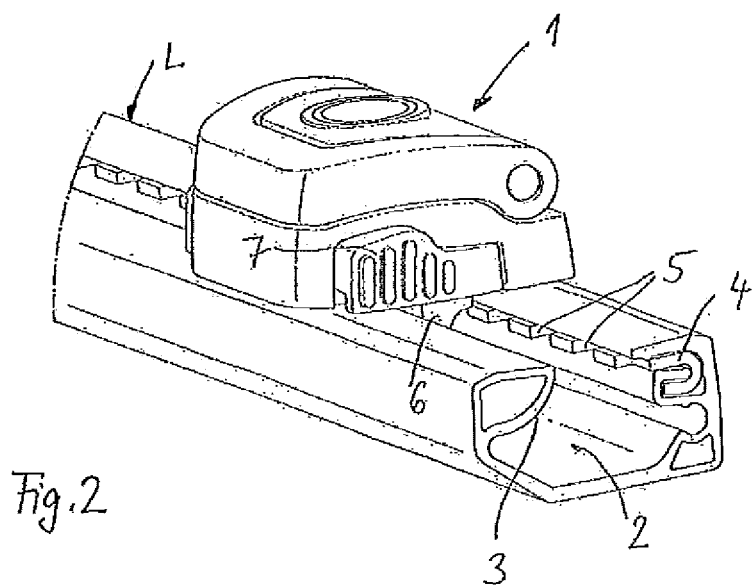
FIG. 2 shows the device according to FIG. 1 in an assembled position of the securing element.

A device for securing stored materials according to FIGS. 1 to 7 has a securing element 1 which can be positioned and blocked in a load rail L. The load rail L is anchored in a storage space of a motor vehicle so as to be fixed to a vehicle and secure in the event of a crash. The load rail L comprises a hollow profile-member 2 having a hollow space which is continuous over the length of the load rail L and which is open in an upward direction via a longitudinal groove which is not described in greater detail. A side of the hollow space is delimited by means of a support wall 3 which is curved in a convex manner. An opposite side of the hollow space of the hollow profile-member 2 comprises below the longitudinal groove a catch bar arrangement 4 which comprises a large number of catch recesses 5 over the length thereof with uniform distribution.

It is possible to insert in the load rail L from above through the longitudinal groove a securing element 1 which comprises a retention region which is introduced from above through the longitudinal groove and a support region which is supported on an upper side of the load rail L in the assembled state. The retention region has two introduction webs 6 which are curved in a concave manner so as to complement the complex support wall 3 of the hollow profile-member 2 of the load rail L. The introduction webs 6 are consequently in abutment in a flush manner with the support wall 3 when the securing element 1 is in the assembled state, as can be seen in FIGS. 6 and 7. Opposite the introduction webs 6, the retention region of the securing element 1 has a displaceably supported additional bar 8 which is provided as a dual bar with two bar projections which are spaced apart from each other and which are parallel with each other (see FIGS. 3 and 4). There is provided between the bar projections of the dual bar a bar member 9 which is movably supported parallel with the bar projections, but independently thereof in the retention region of the securing element 1. Both the bar member 9 and the additional bar 8 are resiliently loaded in the blocking position. The bar projections of the additional bar 8 have a smaller height than the bar member 9 so that an upper side of the bar projections of the additional bar 8, which upper side faces upwards in the direction towards the longitudinal groove of the load rail L in the inserted state, is located at a lower level (below the catch rail arrangement 4) than an upper side of the bar member 9. A manually operable actuation device 7 serves to release the bar member 9 and the additional bar 8 from the blocking position. In the blocking position, the bar projections of the dual bar which acts as an additional bar 8 engage below the catch recesses 5 of the catch bar arrangement 4 or the lower side thereof within the load rail L so that they secure the securing element in a positive-locking manner against lifting in an upward direction. The bar member 9 which is located therebetween protrudes in the blocked state into a catch recess 5 between two catch teeth of the catch bar arrangement 4, the member being supported in the longitudinal direction of the load rail in the catch recess 5 in a positive-locking manner. In the vertical direction of the load rail, the bar projections of the additional bar 8 are effective, which projections engage below the catch teeth of the catch bar arrangement 4 in a positive-locking manner. If the securing element 1 is alternatively inserted into the load rail L in such a manner that the bar projection of the bar member 9 strikes adjacent catch teeth of a corresponding catch recess 5 of the catch bar arrangement 4, the additional bar 8 nonetheless automatically slides with its dual catch projections by means of resilient force below the two adjacent catch teeth of this catch recess so that the securing element 1 is also secured in a positive-locking manner in this position, although the bar member 9 is not introduced into the corresponding catch recess. The important aspect is that the width of the bar projections of the additional bar is greater than the width of a catch recess 5 of the catch bar arrangement 4 so that it is ensured that the bar projections, when positioned in alignment with the adjacent catch recesses below the catch bar arrangement, cannot extend upwards through these catch recesses. Regardless of the position of the securing element 1 when viewed in the longitudinal direction of the load rail L, therefore, either the additional bar 8 or the bar member 9 cooperates with the catch strip arrangement 4 so that an apparent locking of the securing element 1 in the load rail L is prevented. The additional bar 8 is supported like the bar member 9 in the same manner so as to be able to be displaced counter to resilient force in the retention region of the securing element 1.

In the embodiment according to FIGS. 8 to 12, there is provided in a similar manner to FIGS. 1 to 7 a securing element 1a which can be inserted into a load rail L which is identical to the load rail L according to FIGS. 1 to 7. Structurally or functionally identical components of the securing element 1a according to FIGS. 8 to 12 are provided with the same reference numerals with the addition of the letter a. In order to prevent repetition, reference may further be made with respect to identical or functionally identical components and portions of the securing element 1a to the description of the securing element 1 according to FIGS. 1 to 7. The differences of the securing element 1a are set out below.

The securing element 1a, in addition to the introduction webs 6a, also has a bar member 8a which can be constructed as a single or dual bar. An additional bar as in the embodiment according to FIGS. 1 to 7 which can be moved independently of the locking member 8a is not provided in the embodiment according to FIGS. 8 to 12. If the securing element 1a is therefore intended to be moved into the assembled and blocked position thereof—as in the embodiment according to FIGS. 1 to 7—it is first introduced in an oblique manner from above through the longitudinal groove into the load rail L, the introduction webs 6a following the support wall 3 of the hollow profile-member 2. The securing element 1a is pressed downwards until the support region is positioned in a flush manner on the surface of the load rail L. Subsequently, if the bar member 8a is not yet engaged in a corresponding catch recess of the catch bar arrangement 4, the securing element 1a is displaced slightly in the longitudinal direction of the load rail L until the bar member 8a is engaged.

If this additional longitudinal movement to secure the engagement of the bar member 8a in a corresponding catch recess of the catch bar arrangement 4 is not carried out, there is provided in order to identify unsuccessful locking of the securing element 1a a resiliently loaded support means unit 10 which is formed by means of two support pins 10 which protrude in a resiliently loaded manner in a downward direction from a lower side of the support region of the securing element 1a. The support pins 10 are supported so as to be able to be moved in a lifting manner inside the support region of the securing element 1a. There is associated with each support pin 10 inside the support region of the securing element 1a a compression spring which moves the respective support pin 10 in the unloaded state into the support position thereof deployed in a downward direction with respect to the lower side of the support region (see FIG. 9). Corresponding compression spring forces of the compression springs which push the support pins 10 out in a downward direction are selected in such a manner that the inherent weight of the securing element 1a is readily overcome. In the event of manual pressure loading on the securing element 1a from above (see FIGS. 10 and 11), however, the support pins 10 move back into their receiving member within the support region of the securing element 1a. In the support position thereof, the support pins 10 are supported on the surface of the load rail L in such a manner that the securing element 1a is located in an oblique, tilted intermediate position (see FIG. 11). By means of manual pressure on the securing element 1a from above, the securing element 1a is moved into the operating position according to FIG. 10. As a result of corresponding longitudinal displacement of the securing element 1a along the load rail L, an engagement of the bar member 8a can then be brought about. The support pins 10, which are resiliently loaded by the corresponding compression springs in the region of the upper side thereof which protrudes into the retention region of the securing element 1a, can be lowered completely into the corresponding receiving members of the retention region (see FIG. 8). In the non-loaded rest position, the support pins 10 with which there is associated within the retention region a lower stop which prevents the support pins 10 from falling out in a downward direction, protrude in accordance with the illustrations according to FIGS. 9 and 11, 12 downwards beyond the lower side of the support region. In this orientation, the securing element 1a according to FIG. 12 can be moved towards the load rail L and be introduced into the longitudinal groove in the hollow profile-member 2. In the corresponding intermediate position (see FIG. 11), the securing element 1a is positioned in an oblique manner on the upper side of the load rail L as long as no manual pressure is applied to the securing element 1a from above. As soon as manual pressure is applied from above, the securing element 1a is pressed downwards, whereby at the same time the support pins 10 are introduced into the receiving members thereof in the retention region until the position of the support region of the securing element 1a, which position is located in a flush manner on the upper side of the load rail L, is achieved (FIG. 10). As soon as the bar member 8a is locked in a corresponding catch recess of the catch bar arrangement 4, the securing element 1a is blocked in this assembly position. When the bar member 8a is released by corresponding actuation of the actuation device (not described in greater detail) of the securing element 1a, the bar member 8a is released from the corresponding catch recess and the support pins 10 necessarily press the securing element 1a into the oblique intermediate position according to FIG. 11 again. The securing element 1a can now be simply removed manually according to FIG. 12.

The invention claimed is:

1. A device for securing stored materials in a storage space using a securing element which can be locked in a load rail which is anchored so as to be fixed to a vehicle, the securing element having a base member which has a retention region which can be inserted into the load rail in a positive-locking manner, and the securing element comprising at least one bar member for engagement in a catch bar arrangement of the load rail which is supported so as to be able to be moved relative to the base member by an actuation device which can be manually operated in order to be able to be moved between a blocking position and a release position, wherein there is associated with the bar member an additional bar which is movably supported independently of the bar member and which is resiliently loaded in a direction of the blocking position and which can be moved together with the bar member into the release position.

2. The device according to claim 1, wherein the additional bar engages below the catch bar arrangement when the base member is in an inserted state.

3. The device according to claim 1, wherein the additional bar is constructed as a dual bar having two bar projections whose width is greater than a width of a catch recess of the catch bar arrangement and the bar member is positioned between the two bar projections of the additional bar.

4. The device according to claim 1, wherein a width of the bar member is adapted to a width of a catch recess of the catch bar arrangement.

5. A device for securing stored materials in a storage space using a securing element which can be locked in a load rail which is anchored so as to be fixed to a vehicle, the securing element having a base member which has a retention region which can be inserted into the load rail in a positive-locking manner, and the securing element comprising at least one bar member for engagement in a catch bar arrangement of the load rail which is supported so as to be able to be moved relative to the base member by an actuation device which can be manually operated in order to be able to be moved between a blocking position and a release position, wherein the securing element comprises at least one resiliently loaded support which supports the securing element in an unlocked state relative to the load rail in a raised intermediate position which can be visually identified.

6. The securing element for the device according to claim 1.

7. The device according to claim 2, wherein a width of the bar member is adapted to a width of a catch recess of the catch bar arrangement.

8. The device according to claim 3, wherein a width of the bar member is adapted to a width of a catch recess of the catch bar arrangement.

* * * * *